United States Patent
Holt

(10) Patent No.: US 7,974,258 B2
(45) Date of Patent: Jul. 5, 2011

(54) ADAPTIVE MODE TRANSMITTER FOR PAPR REDUCTION AND LINK OPTIMIZATION

(75) Inventor: Keith Holt, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1160 days.

(21) Appl. No.: 11/680,804

(22) Filed: Mar. 1, 2007

(65) Prior Publication Data

US 2008/0214126 A1  Sep. 4, 2008

(51) Int. Cl.
 *H04B 7/208* (2006.01)
 *H04M 1/00* (2006.01)

(52) U.S. Cl. ............... 370/344; 455/102; 455/552.1; 455/426.1

(58) Field of Classification Search .......... 455/102, 455/552.1, 553.1, 426.1, 550.1; 370/343–345
See application file for complete search history.

(56) References Cited

U.S. PATENT DOCUMENTS

| 5,815,525 | A * | 9/1998 | Smith et al. ............... 375/130 |
| 2006/0006943 | A1* | 1/2006 | Clifton et al. ............... 330/285 |
| 2006/0212133 | A1* | 9/2006 | Damnjanovic et al. ....... 700/1 |
| 2006/0291470 | A1* | 12/2006 | Khandekar et al. ....... 370/395.1 |
| 2007/0153673 | A1* | 7/2007 | Tomisato et al. ............ 370/208 |
| 2008/0095263 | A1* | 4/2008 | Xu et al. ..................... 375/295 |
| 2010/0029320 | A1* | 2/2010 | Malladi et al. ............... 455/522 |

OTHER PUBLICATIONS

Apr. 1, 2002, D. Falconer, et al, "Frequency Domain Equalization for Single-Carrier Broadband Wireless Systems", IEEE Communications Magazine, Apr. 2002.

* cited by examiner

*Primary Examiner* — Lester Kincaid
*Assistant Examiner* — Daniel Lai
(74) *Attorney, Agent, or Firm* — Carrie A. Boone, P.C.

(57) ABSTRACT

An adaptive mode transmitter enables either OFDMA or SC-FDMA modulation schemes to be used during transmission of a wireless signal, such as during mobile phone use. The modulation scheme is selected automatically, and is based on characteristics of the transmitting entity, such as bandwidth allocation, selected modulation order, and transmit power.

8 Claims, 5 Drawing Sheets

ADAPTIVE MODE TRANSMITTER FOR PAPR REDUCTION AND LINK OPTIMIZATION

FIELD

This disclosure relates to wireless transmission and, more particularly, to transmission operations for mobile communication.

BACKGROUND

Peak to Average Power Ratio (PAPR) is an important metric for the waveform defined by a wireless standard as it directly impacts transmitter power efficiency and ultimately the battery life of a mobile terminal and/or the coverage area of a cellular base station. At the same time, orthogonal frequency division multiple access (OFDMA) has come to be viewed as a superior modulation scheme. Particularly for the cellular downlink, OFDMA is effectively replacing CDMA in newer broadband wireless standards. However, orthogonal frequency division multiplexing (OFDM) and OFDMA are also known to exhibit a large PAPR, which, although reasonable for the downlink signal from the base station, can be problematic for the uplink signal from the mobile terminal.

WiMAX (i.e., the Worldwide interoperability for Microwave Access), as currently defined by IEEE (Institute of Electrical and Electronics Engineers) 802.16-series specification, uses OFDMA in the uplink due to its generally outstanding properties and in order to simplify the overall standard by maintaining similarity with the downlink signal. In contrast, the long term evolution (LTE) effort in the third generation partnership project, known as 3GPP, is contemplating the use of SC-FDMA (Single Carrier-Frequency Division Multiple Access) in the uplink while maintaining a choice of OFDMA for the downlink. The justification for choosing SC-FDMA over OFDMA in the LTE uplink was due to the PAPR issue.

The split between the WiMAX and the 3GPP/LTE camps over the best form of uplink modulation has stirred some debate within the wireless community. This debate raises the uncertainty about the direction a future release of the WiMAX standard may take. However, since the relative superiority of one scheme over the other is a direct function of the scenario being considered, there is no clear resolution of this issue.

BRIEF DESCRIPTION OF THE DRAWINGS

The foregoing aspects and many of the attendant advantages of this disclosure will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an adaptive mode transmitter and associated methods are disclosed. The adaptive mode transmitter dynamically selects between an available OFDMA or SC-FDMA modulation schemes to be used during transmission of a wireless signal, such as during mobile phone use. The scheme selection takes place automatically, and is based on considerations such as bandwidth allocation, selected modulation order, and transmit power.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Figure 1:
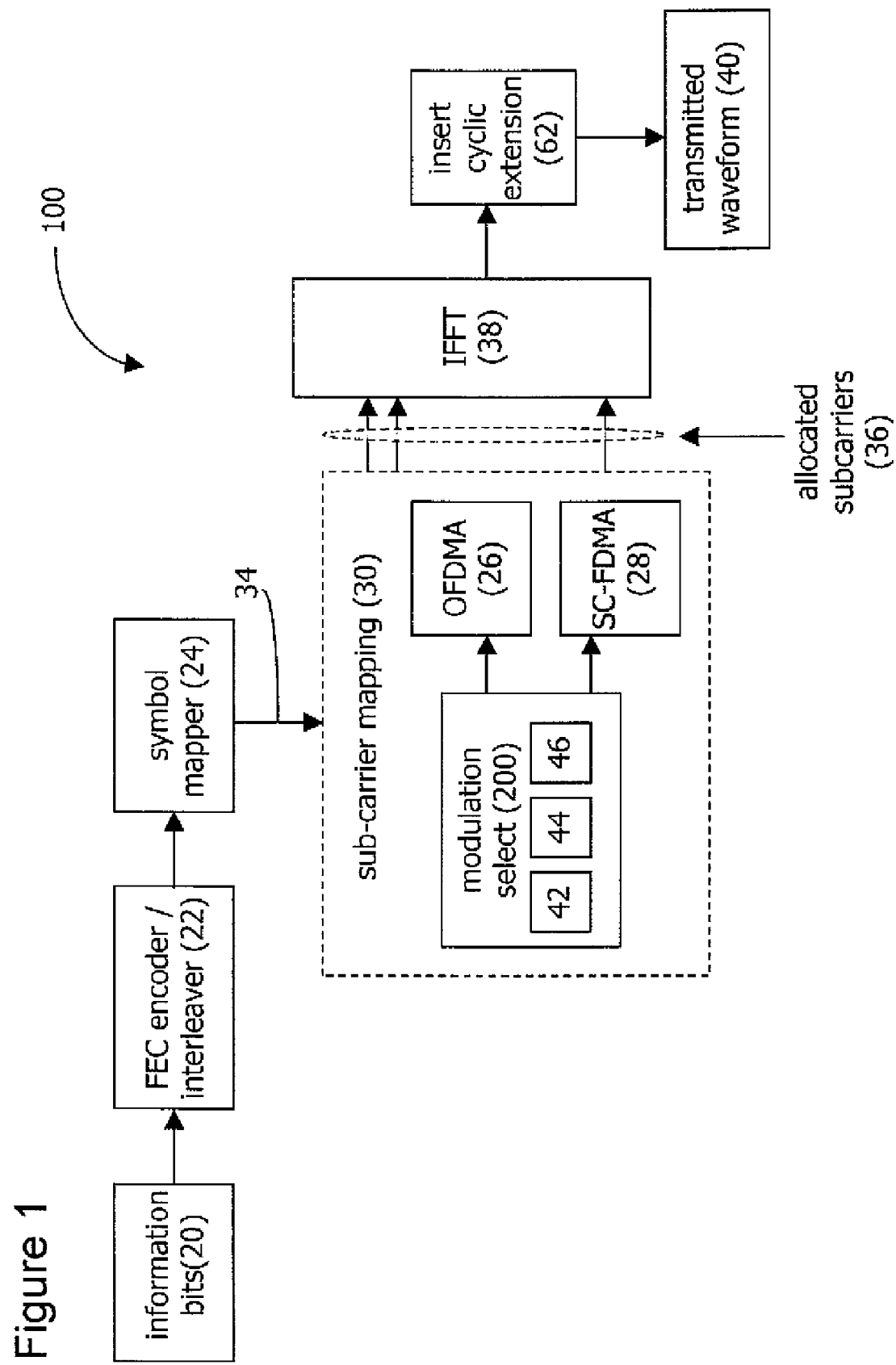
FIG. 1 is a block diagram of an adaptive mode transmitter, according to some embodiments.

FIG. 1 is a block diagram of an example adaptive mode transmitter 100, according to some embodiments. The example adaptive mode transmitter 100 encompasses both OFDMA and SC-FDMA modulation schemes in performing wireless transmission of a signal.

The adaptive mode transmitter 100 receives information 20, which are fed into a forward error correction (FEC) encoding and interleaving unit 22, followed by a symbol mapper 24. In some embodiments, the symbol mapper 24 is a QAM modulator. The QAM modulator 24 is employed to increase the data throughput. Using QAM, a single serial data stream is converted into a larger number of parallel data streams. The QAM modulator 24 generates a time-ordered sequence of signal constellations 34 from the input data stream, which are sent to the sub-carrier mapping unit 30. There, the signal constellations 34 are mapped in a block-wise manner to a set of allocated sub-carriers 36 defined, e.g., from their relationship to the input of an inverse fast Fourier transform (IFFT) 38. The output of the IFFT 38 may then be augmented with a cyclic extension 62 and subsequently serialized as a continuous time domain output stream, i.e., transmitted waveform 40.

The sub-carrier mapping 30 includes a modulation select module 200, to dynamically ascertain which of two or more available modulation schemes to implement, e.g., OFDMA 26 or SC-FDMA 28. The OFDMA 26 may be referred to herein as an OFDMA modulator; the SC-FDMA 28 may be referred to herein as a SC-FDMA modulator. The modulation select module 200 may include and contemplate parameters for bandwidth allocation 42, selected modulation order 44, and transmit power 46 in the dynamic selection of the modulation scheme to be employed. Based, at least in part, on these parameters, the modulation select module 200 dynamically selects one of the available modulators, e.g., the OFDMA 26 modulator or the SC-FDMA 28 modulator, to perform the sub-carrier mapping operation of the incoming serialized data stream 34. Other parameters may be considered by the modulation select module 200. The operations performed by the modulation select module 200 are described further in FIG. 5, below.

With the adaptive mode transmitter 100, the choice of which modulation scheme to use may be decided automatically at the time of transmission based, at least in part, on the bandwidth allocation 42, selected modulation order 44, and transmit power 46. The adaptive mode transmitter 100 may be used in a future wireless standard where both OFDMA and SC-FDMA are supported in the uplink.

Figure 2:
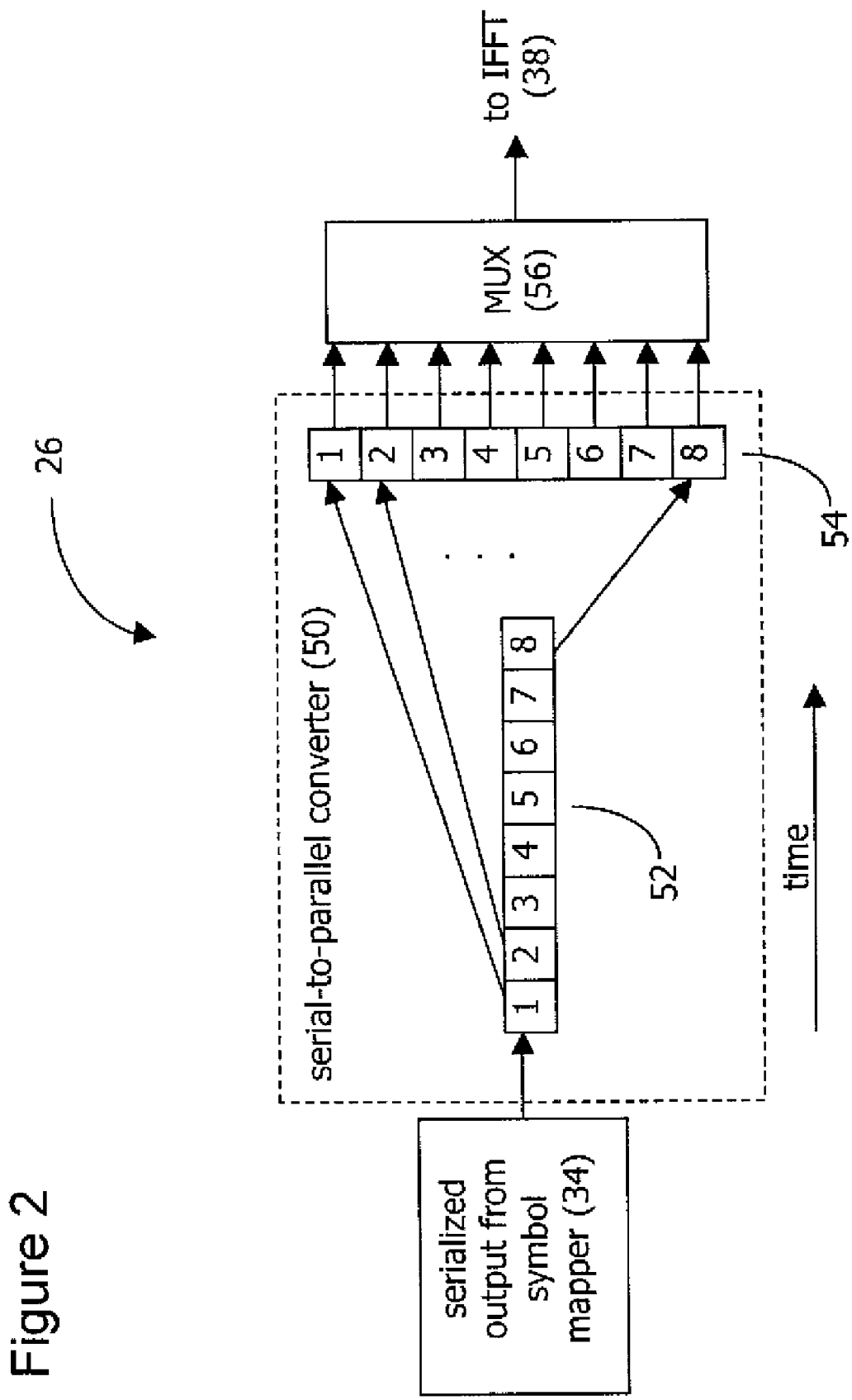
FIG. 2 is a block diagram of sub-carrier mapping for OFDMA transmissions, according to some embodiments.
Figure 3:
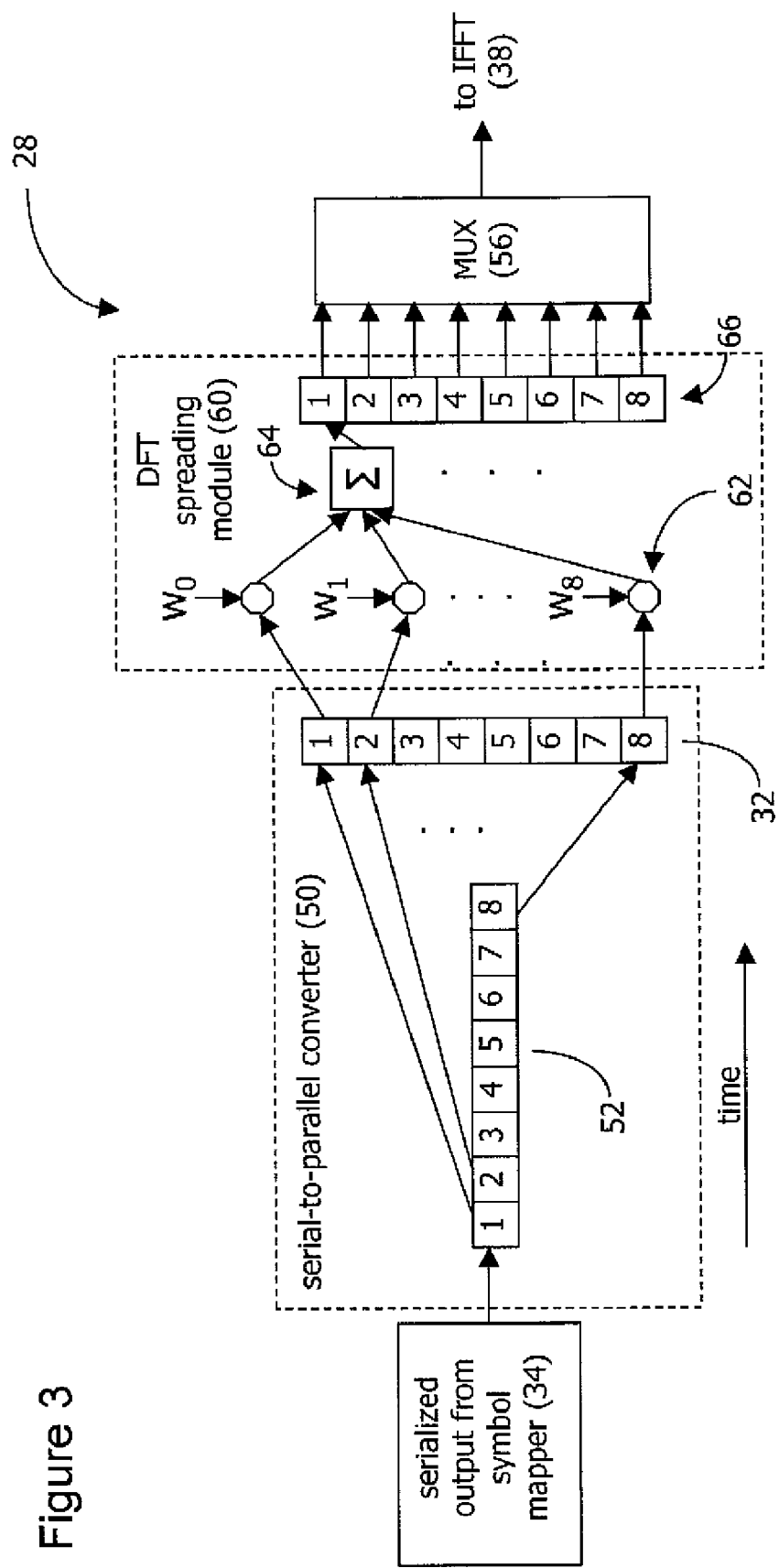
FIG. 3 is a block diagram of sub-carrier mapping for SC-FDMA transmissions, according to some embodiments.

As shown in FIGS. 2 and 3, OFDMA 26 and SC-FDMA 28 modulators are substantially similar when SC-FDMA is viewed from a non-traditional vantage point as an "OFDMA modulator with DFT spreading." This more descriptive terminology perhaps better captures the true origins of SC-FDMA as essentially OFDMA with a spreading function inserted additionally into the signal path.

FIG. 2 is a block diagram of a traditional OFDMA 26 modulation scheme. As shown, the modulation scheme is essentially a serial-to-parallel converter 50 (as indicated with the dotted lines). The serialized output of the symbol mapper 34, shown as a simple one-to-one mapping of QAM symbols 52, to unique sub-carrier assignments 54. The sub-carrier assignments 54 are then fed into a multiplexer (MUX) 56, which are then sent to the IFFT 38 for further processing.

FIG. 3 is a block diagram of a traditional SC-FDMA 28 modulator. The similarities with the OFDMA 26 modulator are evident, wherein the salient distinction between the two modulators is primarily the addition of a DFT spreading module 60. In the SC-FDMA processing path, the assignments 32 shown are not sub-carrier assignments, but are fed into a discrete Fourier transform (DFT spreader 60. The DFT spreader 60 takes each QAM symbol (e.g., "1", "2", . . . , "8" shown in the object 32) and spreads the symbol across all sub-carriers and combined (summation 64) with other QAM symbols, $w_0, w_1, \ldots, w_8$ to form the sub-carrier 66. Since the operations of the OFT spreader 60 are invertible, these operations are inverted at the receiver to recover the original QAM symbol stream 52.

For the SC-FDMA modulation 28, the sub-carrier mapping function is not a one-to-one mapping, but rather involves a process by which each QAM symbol is "spread" across all allocated sub-carriers. Conversely, each sub-carrier represents a linearly weighted combination of all of the QAM symbols in that block. This is the essence of a single carrier system, where the entire allocated signal bandwidth is utilized to transport each information symbol.

As used herein, the DFT spreading function 60 used by the SC-FDMA modulator 28 may be selectively bypassed to effectively implement an OFDMA modulator. The adaptive mode transmitter 100 described herein exploits this characteristic of SC-FDMA, in which DFT spreading is dynamically turned on or off to selectively implement SC-FDMA or OFDMA modulators, respectively. The adaptive mode system 100 may thus be dynamically adapted to function as either a SC-FDMA or an OFDMA system.

Recall that the modulation selection function 200 may contemplate a number of parameters such as, e.g., bandwidth allocation 42, selected modulation order 44, and transmit power 46. Wireless entities that are power constrained at a cell edge may be characterized by a high value for the transmit power parameter 46. These users may strive to maximize their transmitted power and minimize the power amplifier back-off. A parameter describing power amplifier backoff, distinguishable from the one for trasmit power, may also be analyzed by the modulation selection function 200. These users may also be characterized by a low value for the selected modulation order 44' and may utilize low-order modulation such as QPSK. In this scenario, the peak to average power ratio (PAPR) difference between the OFDMA modulator 26 and the SC-FDMA modulator 28 is widest, yet the need to minimize the PAPR is the greatest. Accordingly, users with a low transmit power parameter 46 and a low selected modulation order 44 are likely to favor transmission of an SC-FDMA waveform over an OFDMA one. Put another way, the modulation selection function 200 of the adaptive mode transmitter 100 would, given these parameters 44 and 46, turn on the DFT spreading function 60.

As another example, some users may be characterized by a high selected modulation order 44, for example, those who are transmitting higher order modulation such as 64-QAM with wide-bandwidth allocation who also have a low transmit power parameter 46, e.g., users who have been power-controlled to something less than full power output. Users with these characteristics may benefit less from the low PAPR of SC-FDMA, but may experience performance loss from equalization of its wideband signal. Thus, users with a low transmit power parameter 46 but a high selected modulation order parameter 44 may benefit with an OFDMA waveform, in other words, bypassing the DFT spreading operation 60 (or, equivalently, turning the DFT spreading 60 off).

For a given resource allocation consisting of an assignment of a set of sub-carriers within a corresponding set of OFDM symbols, the number of bits that can be carried should be the same for either OFDMA or SC-FDMA. Thus, the system operation at the higher levels including scheduling, resource allocation, and other functions can be performed without undue alteration when the modulation mode is switched at the physical layer.

Figure 4:
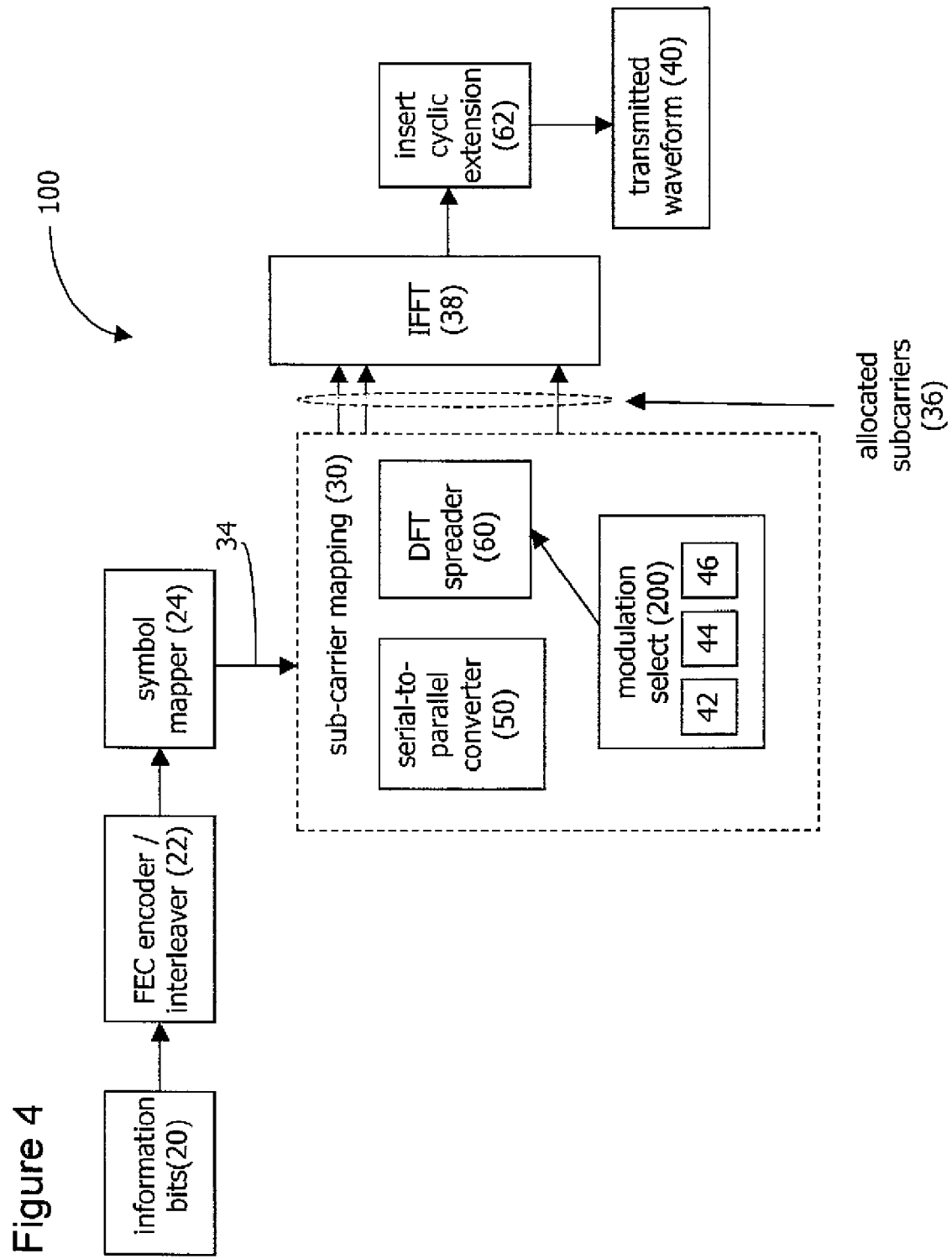
FIG. 4 is a block diagram of an alternative implementation of the adaptive mode transmitter of FIG. 1, according to some embodiments.

Another way to look at the sub-carrier mapping function 30 is depicted in FIG. 4, according to some embodiments. The adaptive mode transmitter 100, instead of deciding whether to select OFDMA modulation 26 or SC-FDMA modulation 28, decides whether to turn on DFT spreading 60 or not. The adaptive mode transmitters 100 in FIGS. 1 and 4 are functionally equivalent.

Figure 5:
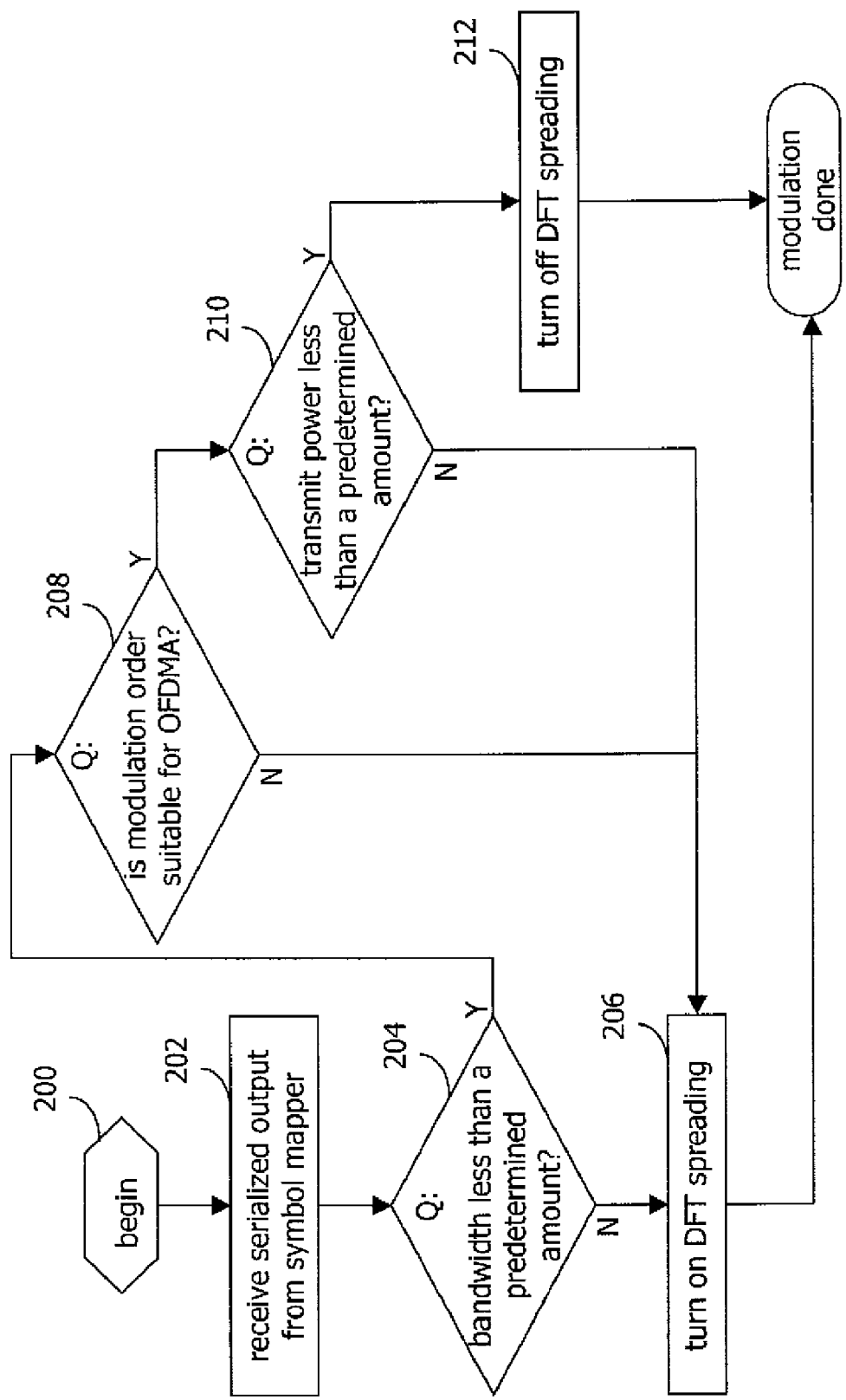
FIG. 5 is a flow of the modulation selection operations performed by the adaptive mode transmitter of FIG. 1, according to some embodiments.

FIG. 5 is a flow diagram depicting operation of the modulation selection 200 of the adaptive mode transmitter 100 of FIG. 1, according to some embodiments. As shown, the sub-carrier mapping function 30 is dynamically selectable, such that the DFT spreading 60 may be applied or not applied to the transmitted waveform, depending on the characteristics of the transmitting entity. The entity may be a mobile phone as one example, or a relatively stationary notebook computing platform, as another example. Once the serialized output 34 from the symbol mapper 24 is received (block 202), the modulation select module 200 checks one or more of parameters 42, 441 and 46 of the transmitting entity.

These parameters may be checked in an order other than is shown in the flow diagram 200. The modulation select module 200 may include a look-up table (LUT), which indicates default values, minimum values, and maximum values for each of the parameters, thus enabling the module to automatically make a determination about which modulation scheme is optimum for the configuration of the transmitting entity. If the bandwidth allocation parameter 42, for example, is less than a predetermined value (which may be stored in the LUT) (block 204), SC-FDMA 28 may be the suitable modulation scheme. Thus, DFT spreading 60 is turned on (block 206).

If the bandwidth allocation parameter 42 is suitable for OFDMA, then the modulation selection module 200 checks whether the modulation order is suitable for OFDMA as well (block 208). If so, the modulation selection module 200 checks also the transmit power parameter 46 (block 210). If the transmit power parameter 46 exceeds a predetermined value, then OFDMA is the preferred modulation scheme, and DFT spreading 60 is turned off (block 212). Otherwise, DFT spreading 60 is turned on (block 206). In this manner, the adaptive mode transmitter 100 is able to ideally adapt the modulation scheme to the characteristics of the transmitting entity.

Alternatively, the decision by the modulation selection module 200 whether to turn the DFT spreading 60 on or off may be made based on any two parameters, any three parameters, a fourth parameter not herein described, and so on. The decision of which parameters to evaluate may be made empirically, such as following a laboratory evaluation. Other criteria may inform which parameters are evaluated by the modulation selection module 200.

While the disclosure has been described with respect to a limited number of embodiments, those skilled in the art will appreciate numerous modifications and variations therefrom. It is intended that the appended claims cover all such modifications and variations as fall within the true spirit and scope of the disclosed subject matter.

What is claimed is:

1. An adaptive mode transmitter, comprising:
    a sub-carrier mapping module to process a stream of information to generate a transmission signal, the sub-carrier mapping module further comprising:
        an orthogonal frequency division multiple access (OFDMA) modulator to generate first sub-carrier assignments, wherein the OFDMA modulator comprises a serial-to-parallel converter to receive a serialized output from a symbol mapper and convert the serialized output into the first sub-carrier assignments;
        a single-carrier frequency division multiple access (SC-FDMA) modulator to generate second sub-carrier assignments, wherein the SC-FDMA modulator comprises a discrete Fourier transform (DFT) spreader to convert non-sub-carrier assignments into the second sub-carrier assignments by combining the non-sub-carrier assignments with a plurality of symbols to form the second sub-carrier assignments; and
        a modulation select module to dynamically select either the OFDMA modulator or the SC-FDMA modulator based on bandwidth allocation, selected modulation order, transmit power, power amplifier backoff, or a combination thereof, all being characteristics of the entity generating the transmission signal; and
    an inverse fast-Fourier transform to receive either the first sub-carrier assignments or the second sub-carrier assignments in generating the transmission signal;
    wherein the modulation select module:
        receives the serialized output from the symbol mapper; and
        when the bandwidth allocation does not exceed a predetermined threshold bandwidth allocation; or
        when the modulation order does not exceed a predetermined threshold modulation order; or
        when the transmit power exceeds a predetermined threshold transmit power;
        then, the modulation select module turns on the DFT spreader.

2. The adaptive mode transmitter of claim 1, wherein the entity is a mobile phone.

3. The adaptive mode transmitter of claim 1, wherein the serialized output from the symbol mapper comprises quadrature amplitude modulation symbols.

4. The adaptive mode transmitter of claim 3, wherein the plurality of symbols combined with the non-sub-carrier assignments in the SC-FDMA modulator comprise a second set of quadrature amplitude modulation symbols.

5. The adaptive mode transmitter of claim 1, wherein:
    when the transmit power is below a predetermined threshold transmit power; and
    when the modulation order is below a predetermined threshold modulation order; then the modulation select module selects the SC-FDMA modulator.

6. The adaptive mode transmitter of claim 1, wherein:
    when the transmit power is below a predetermined threshold transmit power; and
    when the modulation order is above a predetermined threshold modulation order;
    then the modulation select module selects the OFDMA modulator.

7. The adaptive mode transmitter of claim 1, the OFDMA modulator further comprising a serial-to-parallel converter to map the stream of information comprising symbols into a parallel data stream, the parallel data stream comprising parallel symbols, the parallel symbols comprising the first sub-carrier assignments.

8. The adaptive mode transmitter of claim 7, the SC-FDMA modulator further comprising:
    a serial-to-parallel converter to map the stream of information comprising symbols into a parallel data stream, the parallel data stream comprising parallel symbols;
    a spreading module to combine the parallel symbols with other symbols to form the second sub-carrier assignments.

* * * * *